United States Patent [19]

Kasprzak

[11] 4,218,250
[45] Aug. 19, 1980

[54] POLISH FORMULATIONS

[75] Inventor: Kenneth A. Kasprzak, Saginaw, Mich.

[73] Assignee: Dow Corning Corporation, Midland, Mich.

[21] Appl. No.: 946,486

[22] Filed: Sep. 28, 1978

[51] Int. Cl.$^2$ .................... C09G 1/02; C09G 1/04; C09G 1/12

[52] U.S. Cl. ........................................ 106/3; 260/6; 260/13; 260/28 R; 260/29.2 M; 260/375 B; 525/477

[58] Field of Search ................ 106/3; 260/28 R, 825, 260/824 R, 29.2 M, 13, 6; 525/477

[56] References Cited

U.S. PATENT DOCUMENTS

| | | | |
|---|---|---|---|
| 3,544,498 | 12/1970 | Holdstock et al. | 106/3 |
| 3,929,492 | 12/1975 | Chapman et al. | 106/3 |

FOREIGN PATENT DOCUMENTS 746973  11/1966  Canada ........................................ 106/3

*Primary Examiner*—Allan Lieberman
*Attorney, Agent, or Firm*—Jack E. Moermond

[57] ABSTRACT

Improvement of polish formulations containing a wax and/or an abrasive and optionally at least one member selected from the group consisting of solvents, surfactants, thickening agents, detergent resistant additives, colorants, odorants, and other ingredients normally used in making polishes is disclosed by incorporating in the polish (a) a cyclodimethylsiloxane fluid, (b) a polydiorganosiloxane-polyoxyalkylene copolymer, and (c) water. Further advantages may also be achieved by the incorporation of an organic water-in-oil surfactant having an HLB value of 2–10 and/or certain silicone-glycol copolymers in the polish.

12 Claims, No Drawings

POLISH FORMULATIONS

BACKGROUND OF THE INVENTION

One essential function of all polishes is the protection of the article or substrate to which they are applied. Ancillary but nonetheless important properties and functions which polishes are often required to possess include appearance (gloss) of the article; durability to water, solvent (alcohol) and detergent (washing); little or no build up with repeated applications; and easy application (i.e., easy to wipe out or rub out). Researchers in the field of polishes are constantly looking for ingredients and polish formulations which will result in the finished product having all those properties desired and none of the deleterious properties often encountered.

SUMMARY OF THE INVENTION

This invention relates to the incorporation of (a) a cyclodimethylsiloxane, (b) a polydiorganosiloxane-polyoxyalkylene copolymer, and (c) water into wax and/or abrasive containing polish formulations. Enhanced stability and performance of water-in-oil emulsion type polishes, for example, can be achieved by such incorporation. It has further been discovered that when component (d), an organic water-in-oil surfactant having an HLB value of 2-10 is included, performance is further enhanced. The four components above can advantageously be used in the preparation of detergent resistant polishes. Finally, it has been discovered that the addition of certain silicon-glycol copolymers to the polish formulations causes inverson of the systems for oil-in-water system usage.

DESCRIPTION OF THE PREFERRED EMBODIMENTS

This invention relates to a polish formulation containing as components thereof a wax and/or an abrasive and optionally at least one member selected from the group consisting of solvents, surfactants, thickening agents, detergent resistant additives, colorants, odorants, and other ingredients normally used in making polishes, the improvement which consists of incorporating into the polish formulation, based on the total weight of the polish formulation, (a) 5 to 60 percent by weight of a cyclodimethylsiloxane fluid, (b) 0.5 to 10 percent by weight of a polydiorganosiloxane-polyoxy-alkylene copolymer in which copolymer (i) at least 95 percent of the organo groups in the siloxane portion are methyl groups, any remaining organo groups being selected from the group consisting of ethyl, vinyl, and phenyl groups, (ii) the polyoxyalkylene portion consists of 50 to 100 mol percent oxyethylene units and 0 to 50 mol percent oxypropylene units, and the polyoxyalkylene portion has a molecular weight of at least 1000, and (iii) the weight ratio of the siloxane portion of the copolymer to the polyoxyalkylene portion of the copolymer is in the range of 2-8:1, and (c) 30 to 95 percent by weight of water.

Advantageously there is also added to the polish from 0.5 to 5 percent by weight, based on the total weight of the polish formulation, of component (d) which is an organic water-in-oil surfactant having an HLB value of 2-10.

Also there may be included in the polish formulation a silicon-glycol copolymer having the general formula $(CH_3)_3SiO[(CH_3)_2SiO]_x[G(CH_3)SiO]_ySi(CH_3)_3$ wherein x has an average value of 0 to 10, y has an average value of 1 to 10, G has the formula $—D—(OC_2H_4)_zOH$ wherein D is an alkylene radical containing from 2 to 10 carbon atoms, z has an average value of from 6 to 20, and the weight ratio of the silicone portion to the glycol portion is less than 1.

The waxes which can be employed in the polish formulations of this invention are well known to those skilled in the art and will vary depending on the specific use intended for the polish and the properties being sought. Specific examples of suitable waxes include animal waxes such as beeswax, spermaceti, lanolin and shellac wax; vegetable waxes such as carnauba, candelilla, bayberry, and sugarcane; mineral waxes such as ozacerite, ceresin, montan, paraffin, microcrystalline and petrolatum; and synthetic waxes such as ethylenic polymers, polyol ether-esters and chlorinated naphthalenes.

The abrasives which can be used in the polish formulations of this invention are well known to those skilled in the art and the particular one(s) chosen will depend on the nature of the surface to be polished and the results desired. Specific examples of suitable abrasives include aluminum silicate, diatomaceous earth, pumice, Fuller's earth, bentonite, silicas, tripoli, hydrated calcium silicate, chalk, colloidal clay, magnesium oxide, red iron oxide, and tin oxide.

Also there is commonly employed in polish formulations solvents (e.g. V.M.&P. naphtha, Stoddard solvent, naphtha mineral spirits, water, kerosene), surfactants (e.g. polyoxyethylene sorbitan monooleate, fatty alcohol amine sulfate), thickening agents (e.g. soya lecithin, methyl cellulose); detergent resistant additives (e.g. aminofunctional and carboxyfunctional silicones), colorants, odorants, corrosion inhibitors and other ingredients normally used in making polishes. Such ingredients are well known to the skilled artisan and hence are only mentioned to the above extent for the sake of brevity.

It should be noted that this invention is applicable to all forms of wax and/or abrasive containing polishes which includes solvent based polishes, water based (emulsion) polishes, and paste wax polishes.

Component (a) incorporated into the polish formulations in accordance with this invention is a cyclodimethylsiloxane fluid. Such fluids are well known materials in the literature and many of them are available commercially from a number of sources. Cyclodimethylsiloxane fluids can be defined by the general formula $[(CH_3)_2SiO]_c$ where c has a value of from 3 to about 8. The commercial cyclodimethylsiloxanes, as is typical of most commercial siloxanes, are mixtures of the various cyclic species represented by the foregoing formula. Preferred for use in accordance with this invention are the cyclodimethylsiloxane fluids in which the cyclooctamethyltetrasiloxane species (i.e., c equals 4) predominates the mixture. The cyclodimethylsiloxane can constitute from 5 to 60 percent by weight of the polish formulation but preferably is used in an amount ranging from 35 to 50 percent.

Component (b) incorporated into the polish formulations in accordance with this invention is a polydiorganosiloxane-polyoxyalkylene copolymer. This copolymer can constitute from 0.5 to 10 percent by weight of the polish formulation but preferably is used in an amount ranging from 0.5 to 5 percent. In the organosiloxane portion of component (b) at least 95 percent of the organo groups must be methyl radicals with any remaining radicals being ethyl, vinyl or phenyl radicals. The polyoxyalkylene portion of the copolymer (b) must have a molecular weight of at least 1000 and consist of 50 to 100 mol percent oxyethylene units and from 0 to 50 mol percent of oxypropylene units. The weight ratio of the siloxane portion of the copolymer to the polyoxyalkylene portion of the copolymer must be in the range of 2–8:1. The polydiorganosiloxane-polyoxyalkylene copolymers useful in this invention can be prepared by any of the techniques well known to those skilled in the art such as by coupling the appropriate allyloxy ended polyoxyalkylene to the appropriate SiH containing siloxane with the aid of a platinum catalyst, or by reacting a polydiorganosiloxane containing hydrolyzable groups (e.g. methoxy groups) with a hydroxyl containing polyoxyalkylene, or by any of the other well known techniques for making such copolymers. The polyoxyalkylene portion of component (b) can be uncapped (e.g. OH ended) or capped (e.g. methyl ether or acetoxy capped) by any of the groupings well known to those in this art. In other words, so far as is known for purposes of this invention the terminating group of the polyoxyalkylene portion of component (b) is not significant.

Component (c) incorporated into the polish formulations in accordance with this invention is water and constitutes from 30 to 95, preferably 30 to 60 percent by weight of the polish formulation.

It is highly desirable to also include component (d) in the polish formulations of this invention. Component (d) is an organic (that is non-silicone or silicone free) water-in-oil surfactant having an HLB (hydrophilic-lipophilic balance) value in the range of 2–10. Surfactants having an HLB value of 2–10 are known to those skilled in the surfactant art and include anionic, cationic and non-ionic type surfactants. Specific examples of such surfactants are sodium capryl lactylate, sodium stearoyl lactylate, certain quaternary ammonium chlorides, polyethylene glycol (200) monolaurate, glycerol monolaurate, N,N-dimethylcaproamide, diethylene glycol monolaurate, sorbitan monolaurate and nonylphenoxy polyoxyethanol to mention just a few such surfactants. Standard publications such as McCutcheon's *Detergents and Emulsifiers* published yearly by Allured Publishing Company of Ridgewood, N. J. is one source listing such materials. Component (d) can make up from 0.5 to 5 percent by weight of the polish formulation but generally is used in an amount ranging from 0.75 to 2.5 percent.

A final component which can be added to the polish formulations in accordance with this invention is a silicone-glycol copolymer having the general formula $(CH_3)_3SiO[(CH_3)_2SiO]_x[G(CH_3)SiO]_ySi(CH_3)_3$ wherein x has an average value from 0 to 10, y has an average value from 1 to 10, G is a radical of the formula —$D(OC_2H_4)_zOH$ where D is an alkylene radical containing from 2 to 10 carbon atoms, z has an average value from 6 to 20, and the weight ratio of the siloxane portion of this copolymer to the glycol portion is less than 1. These silicone-glycol copolymers are well known to those skilled in the art and are available on a commercial basis, or they can be easily prepared by well known procedures. These silicone-glycol copolymers can be used in amounts up to 10 percent by weight of the polish formulation and are employed most advantageously when an inversion of the polish system from a water-in-oil to oil-in-water type is desired.

Now in order that those skilled in the art may better understand how the present invention can be practiced, the following examples are given by way of illustration and not by way of limitation. All parts and percents referred to herein are by weight and all viscosities measured at 25° C. unless otherwise specified.

EXAMPLE 1

A pre-softened paste polish was prepared by mixing (1) 6 parts of a 50 percent solvent (35 percent Stoddard solvent, 15 percent isopropylalcohol) solution of an aminofunctional silicone prepared by reacting 9 parts of a hydroxyl endblocked polydimethylsiloxane with 1 part of $(CH_3O)_3Si(CH_2)_3NHCH_2CH_2NH_2$; (2) 1 part of an aminofunctional silicone prepared by reacting a mixture of 75 percent of a hydroxyl endblocked polydimethylsiloxane, 15 percent of $(CH_3O)_3Si(CH_2)_3NHCH_2CH_2NH_2$ and 10 percent of $(CH_3O)_3SiCH_3$; (3) 43.65 parts of a cyclopolydimethylsiloxane fluid composed predominately of the cyclotetrasiloxane species and having a viscosity of about 2.5 centistokes; (4) 4.85 parts of a polydiorganosiloxane-polyoxyalkylene copolymer in which all the organo groups in the siloxane portion were methyl groups, the polyoxyalkylene portion consisted of about 50 mol percent oxyethylene units and about 50 mol percent oxypropylene units and had a molecular weight of about 2500, and the weight ratio of the siloxane portion to the polyoxyalkylene portion was about 3, and the copolymer had the average general formula

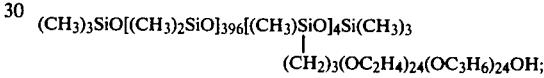

$(CH_3)_3SiO[(CH_3)_2SiO]_{396}[(CH_3)SiO]_4Si(CH_3)_3$
$\quad\quad\quad\quad\quad\quad\quad\quad|$
$\quad\quad\quad\quad\quad\quad\quad(CH_2)_3(OC_2H_4)_{24}(OC_3H_6)_{24}OH$;

(5) 1.5 parts of a polyoxyethylene alkylaryl ether (Hodag Nonionic E-4) which is an organic water-in-oil surfactant having an HLB value of 8.6; (6) 10 parts of an aluminum silicate abrasive (Kaopolite SF-O); and then adding (7) 50 parts of water and mixing under great shear.

For purposes of comparison a polish component was prepared which consisted of 6 parts of ingredient (1) above, 1 part of ingredient (2), 10 parts of ingredient (6), 60 parts ingredient (7), 22 parts of Stoddard solvent, and 1 part of a polyhydric alcohol-fatty acid ester emulsifier with unesterified hydroxy groups (Emcol 14).

The above prepared polishes were compared for detergent resistance by applying them to panels, rubbing them out, and then allowing the panels to age for 24 hours. An area of each panel was then scrubbed for about 30 seconds with a concentrated liquid detergent, then rinsed with water and evaluated for gloss. The polish of this invention although giving a slightly hazy film survived 20–25 washings compared to 15–20 washings for the control polish.

EXAMPLE 2

A polish composition was prepared by mixing 43.65 parts of ingredient (3) of Example 1, 4.85 parts of ingredient (4), 1.5 parts of ingredient (5), 3.2 parts of a trimethylsilyl endblocked polydimethylsiloxane fluid having a viscosity of 60,000 cs., 0.8 part of a trimethylsilyl endblocked polydimethylsiloxane fluid having a viscosity of 350 cs., and 50 parts of ingredient (7), and then mixing on an Eppenbach mixer.

A second polish composition was prepared by mixing 43.65 parts of ingredient (3) of Example 1, 4.85 parts of ingredient (4), 1.5 parts of ingredient (5), 6 parts of ingredient (1), 1 part ingredient (2), 25 additional parts of ingredient (3), 10 parts of ingredient (6), and 50 parts of ingredient (7), and then mixing on an Eppenbach mixer.

Both of the polish formulations of this example were good cleaner polishes although they gave slightly hazy films.

EXAMPLE 3

A pre-softened paste polish composition was prepared by briskly agitating a mixture of 20 parts of water, 10 parts of aluminum silicate abrasive (Kaopolite SF-O), and 1 part of polyoxyethylene sorbitan monolaurate nonionic surfactant (Tween 20). To this mixture there was slowly added a mixture of 21 parts of ingredient (3) of Example 1, 1 parts of ingredient (4), 6 parts of ingredient (1) and 1 part of ingredient (2). When the addition was complete and the resulting mixture uniform, there was slowly added 40 parts of water and mixing continued until the product was again uniform.

It is believed the above formulation is particularly suitable for use on lightly oxidized surfaces such as late-model automobiles. The polish is best applied to a clean, dry surface with a dry cloth and using a circular motion. After application the polish should be allowed to dry to a haze, usually 15–30 minutes, and then may be buffed with a clean, dry, soft cloth to obtain a gloss.

EXAMPLE 4

43.65 parts of ingredient (3) of Example 1, 4.85 parts of ingredient (4) and 1.5 parts of ingredient (5) were mixed until uniform. Next 50 parts of water was slowly added with mixing, and after addition of the water was complete a high shear mixing of the ingredients was carried out. To this mixture there was then added with thorough mixing a previously prepared uniform slurry consisting of 6 parts of ingredient (1) of Example 1, 1 part of ingredient (2), and 10 parts of ingredient (6). The resulting product was a highly stable waxless pre-softened paste polish.

EXAMPLE 5

A uniform mixture consisting of 11 parts of ingredient (3) of Example 1, 0.4 part of ingredient (4), 3.2 parts of a trimethylsilyl endblocked polydimethylsiloxane fluid having a viscosity of 350 cs., 0.8 part of a trimethylsilyl endblocked polydimethylsiloxane fluid having a viscosity of 60,000 cs., and 0.4 part of a modified alkanolamide nonionic surfactant (Witcamide 511). To this there was added, with agitation, a previously prepared mixture of 51.8 parts of water and 12.8 parts of a 10 percent wax emulsion (Co-Wax Emulsion). The resulting product was placed in an aerosol container which was then charged with 20 parts of dichlorodifluoromethane propellant to obtain an aerosol polish composition.

EXAMPLE 6

An oil-in-water type detergent resistant auto polish was prepared and consisted of 6 parts of ingredient (1) of Example 1, 1 part of ingredient (2), 18 parts of ingredient (3), 2 parts of ingredient (4), 10 parts of ingredient (6), 60 parts of ingredient (7), and 5 parts of a silicone-glycol copolymer having the general formula

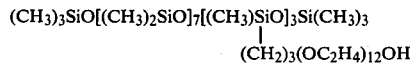

That which is claimed is:

1. In a water-in-oil polish formulation containing as components thereof a wax and/or an abrasive and optionally at least one member selected from the group consisting of solvents, surfactants thickening agents, detergent resistant additives, colorants, odorants, and other ingredients normally used in making polishes, the improvement which consists of incorporating into the polish formulation, based on the total weight of the polish formulations,
(a) 5 to 60 percent by weight of a cyclodoimethylsiloxane fluid,
(b) 0.5 to 10 percent by weight of a polydiorganosiloxanepolyoxyalkylene copolymer in which copolymer
 (i) at least 95 percent of the organo groups in the siloxane portion are methyl groups, any remaining organo groups being selected from the group consisting of ethyl, vinyl, and phenyl groups,
 (ii) the polyoxyalkylene portion consists of 50 to 100 mol percent oxyethylene units and 0 to 50 mol percent oxypropylene units, and the polyoxyalkylene portion has a molecular weight of at least 1000, and
 (iii) the weight ratio of the siloxane portion of the copolymer to the polyoxalkylene portion of the copolymer is in the range of 2–8:1, and
(c) 30 to 95 percent by weight of water.

2. A polish as defined in claim 1 wherein the composition incorporated also contains (d) from 0.5 to 5 percent by weight of an organic water-in-oil surfactant having an HLB value in the range of 2–10.

3. A polish as defined in claim 1 wherein there is also included in the polish to invert it to an oil-in-water polish a silicone-glycol copolymer of the general formula

wherein
$x$ has an average value of from 0 to 10,
$y$ has an average value of from 1 to 10,
G has the formula $-D(OC_2H_4)_zOH$ wherein D is an alkylene radical containing from 2 to 10 carbon atoms, and
$z$ has an average value of from 6 to 20, and the weight ratio of the silicone portion to the glycol portion is less than 1.

4. A polish as defined in claim 2 wherein there is also included in the polish to invert it to an oil-in-water polish a silicone-glycol copolymer of the general formula

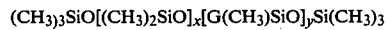

wherein
$x$ has an average value of from 0 to 10, $y$ has an average value of from 1 to 10, G has the formula $-D-(OC_2H_4)_zOH$ wherein D is an alkylene radical containing from 2 to 10 carbon atoms, and
$z$ has an average value of from 6 to 20, and the weight ratio of the silicone portion to the glycol portion is less than 1.

5. a polish as defined in claim 1 wherein (a) is 35 to 50 percent, (b) is 0.5 to 5 percent, and (c) is 30 to 60 percent.

6. A polish as defined in claim 5 wherein (a) has the general formula $[(CH_3)_2SiO]_c$ where c has a value of 3 to 8 and (b) has all methyl groups for the organo groups in the siloxane portion, and about 50 mol percent oxyethylene units and about 50 mol percent oxypropylene units in the polyoxyalkylene portion.

7. A polish as defined in claim 6 wherein (a) is a mixture of the cyclodimethylsiloxanes in which cyclooctamethyltetrasiloxane is the predominant species.

8. A polish as defined in claim 7 which also contains at least one aminofunctional silicone detergent resistant additive.

9. A polish as defined in claim 2 wherein (a) is 35 to 50 percent, (b) is 0.5 to 5 percent, (c) is 30 to 60 percent, and (d) is 0.75 to 2.5 percent.

10. A polish as defined in claim 9 wherein (a) has the general formula $[(CH_3)_2SiO]_c$ where c has a value of 3 to 8, (b) has all methyl groups for the organo group in the siloxane portion, and about 50 mol percent oxyethylene units and about 50 mol percent oxypropylene units in the polyoxyalkylene portion, and (d) is a nonionic surfactant.

11. A polish as defined in claim 10 wherein (a) is a mixture of the cyclodimethylsiloxanes in which cyclooctamethyltetrasiloxane is the predominate species.

12. A polish as defined in claim 10 which also contains at least one aminofunctional silicone detergent resistant additive.

* * * * *